United States Patent [19]

Altadonna

[11] 4,239,130
[45] Dec. 16, 1980

[54] OIL CADDY

[76] Inventor: Lawrence J. Altadonna, 2859 Gatling Dr., St. Louis, Mo. 63129

[21] Appl. No.: 31,174

[22] Filed: Apr. 18, 1979

[51] Int. Cl.³ .......................... B65B 39/00; B67B 7/24
[52] U.S. Cl. ..................... 222/131; 222/88; 222/89; 222/460; 141/332; 206/335; 206/446
[58] Field of Search ............................... 141/331–345, 141/98; 222/80, 81, 89, 90, 91, 85, 86, 88, 192, 83.5, 131, 460, 461, 462

[56] References Cited

U.S. PATENT DOCUMENTS

| 327,225 | 9/1885 | Bleton et al. | 222/131 X |
| 2,142,293 | 1/1939 | Waite | 222/90 |
| 2,767,744 | 10/1956 | Beerman | 141/332 X |
| 2,919,835 | 1/1960 | Butler | 222/86 |
| 3,750,722 | 8/1973 | Nowak | 141/332 X |

Primary Examiner—Allen N. Knowles
Attorney, Agent, or Firm—Jerome A. Gross

[57] ABSTRACT

A canister for storing a can of oil has an arrangement to mount it within the engine compartment or trunk of an automobile or to other motorized vehicles. An inverted funnel is secured to the upper end of the cannister, serving as a cover enclosure or upon detachment, as a funnel for adding oil to the engine. The funnel spout receives a cap or stopper which has a handle on its outer side and a can opener on its inner side normally enclosed within the funnel.

2 Claims, 2 Drawing Figures

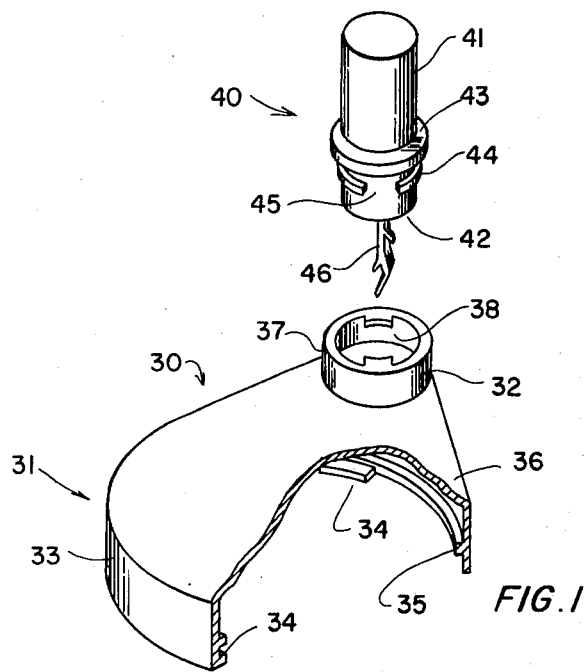
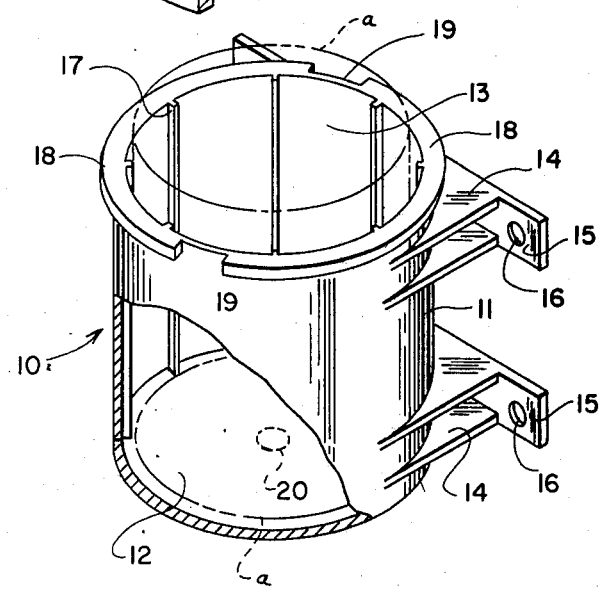
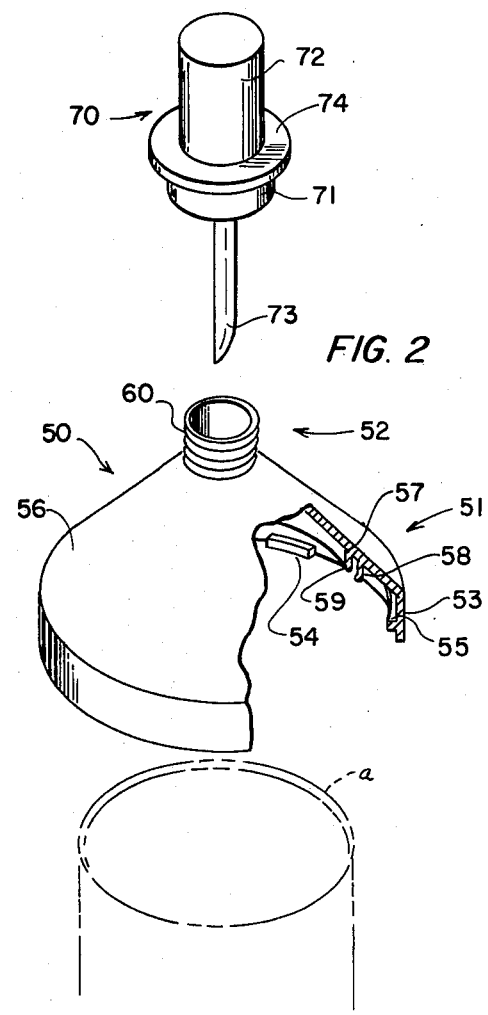
FIG. 1
FIG. 2

OIL CADDY

BACKGROUND OF THE INVENTION

The present invention relates to devices for storing can containers of oil and the like in automobiles or other motorized vehicles.

An automobile owner truly dedicated to caring for his automobile may carry one or more cans of his favorite brand of engine oil in his automobile at all times, as well as some type of oil can opener and sometimes a funnel. These are stored in the trunk or, for a hatchback style automobile, on the carpeted area behind the rear seat. The cans, sometimes made of paper, tend to roll and rattle about, often leaking oil through their paper sides and occasionally bursting. The can opener and funnel, oftentimes oily, may also roll about. This is obviously undesirable.

SUMMARY OF THE INVENTION

A principal purpose of the present invention is to provide apparatus for storing a can of oil in an out-of-the-way place on a motor vehicle, from which oil will not leak onto portions of the vehicle which are desirably kept clean. Another purpose is to provide such apparatus having a can opener and funnel.

Briefly summarizing, the present invention comprises a substantially cylindrical canister having means to mount it to a convenient support of an automobile, truck, motorcycle, or motorboat, such as the firewall of an automobile. The canister is of sufficient size to hold upright an oil can container extending above the canister upper end, for ease of removal. Inner longitudinal ribs within the canister eliminate rattling and avoid suction which could be induced in removing the can. An inverted funnel, utilized in pouring oil into the engine, is secured by its lower enlarged end to the canister upper end, forming a lid. The spout end of the funnel is closed by a removable stopper which includes a can opener on its inner end, for storage within the funnel, and a handle on its outer end by which the can opener is manipulated when the stopper is removed. cl BRIEF DESCRIPTION OF THE DRAWINGS FIG. 1 is an exploded view, partially broken away, of an oil caddy embodying the present invention.

FIG. 2 is a similar view of an alternate funnel and stopper, which may be mounted on the canister of FIG. 1.

DESCRIPTION OF THE PREFERRED EMBODIMENT

In a preferred embodiment of the present invention, a standard-size can container of oil a, such as a can of engine oil for an automobile, is shown in phantom lines in FIG. 1. Such cans are generally of the type having a cylindrical impregnated paper side wall and circular ends of thin metal fastened to the paper by a crimped edge. For mounting these cans a to a convenient support of an automobile, truck, motorcycle, airplane, motorboat, other motorized vehicle or a stationary engine, the present invention provides apparatus including a canister mounted to the vehicle support, a funnel for adding oil to the engine and, when inverted, serving as a cover for the canister, and a stopper to close the funnel spout, the stopper having an attached can opener device.

The preferred apparatus, as shown in FIG. 1, is made up of a molded plastic canister body, generally designated 10, of sufficient size to hold upright a can of oil a, having a substantially cylindrical side wall 11 and a circular lower side wall 12. The canister body 10 has an open upper end 13 to accept a can a inserted into the canister body; the height of the canister side wall 11 being such that the can a will extend above the open upper end 13. The outer side of the canister body 10 is provided with integrally molded mounting brackets 14 whose mounting plate portions 15 lie in a common vertical plane substantially tangent to the outer side of the canister body 10. The mounting plate portions 15 have bores 16 whereby the canister may be mounted to a substantially flat convenient support of the vehicle, such as by machine screws. On its inner side, the canister body 10 has a plurality of flexible radially-inward projecting longitudinal ribs 17 whose inner ends would lie on a cylinder of substantially the same diameter as the oil can a. These ribs 17 support the can a from rattling and provide space between the can a and the canister body. This space eliminates surface tension which might be caused by oil between the outer surface of the can and inner surface of the canister body and could cause suction upon removal of the can a. The body lower side 12 slopes to a center oil drain break-out provision 20. When the apparatus is mounted in a plate convenient for allowing leaking oil to drain from the canister body 10, the oil drain break-out provision 20 is broken out.

The upper end of the cylindrical wall 11 of the canister 10 is provided with an integral outer annular locking ring or flange 18. The locking ring 18 has two or more equally-spaced notch portions 19, at which the outer side of the cylindrical wall 11 extends substantially uninterrupted upward to the body upper end 14.

For enclosing the can a within the canister body 10, to assure that the can a remains in place and that an open, partially-used can a may be stored free of dust and moisture, an inverted funnel-like member, generally designated 30 and later referred to as a funnel, is provided to serve as a lid or cover for the canister body 10. The funnel 30 is made up of a larger receiving end portion, generally designated 31, which tapers to a smaller opposite discharging end portion, generally designated 32. The larger receiving end portion 31 terminates in a substantially cylindrical end 33 which has, on the outer edge of its inner side, a plurality of equally-spaced, radially-inward extending locking tabs 34 of such length that they may pass through the notch portions 19 of the canister locking ring 18. Spaced longitudinally inward of the locking tabs 34 is an annular sealing ring 35 extending radially inward such that when the funnel 30 is locked in place on the canister 10, the ring 35 will rest on the upper end of the canister locking ring 18, whereby to substantially seal the funnel 30 to the canister body 10.

Axially beyond the sealing ring 35, the receiving end portion 31 has a tapered wall 36 extending from the cylindrical end 33 to the funnel discharging end portion 32. The discharging end portion 32 is made up a spout 37, which in the preferred embodiment is offset from the axis of the cylindrical end 33. The cylindrical spout 37 has, on its inner wall, a pair of opposite radially-inward extending inner locking tabs 38.

To close the spout 37 of the funnel 30, the apparatus is provided with a stopper-like member, generally designated 40 and later referred to as a stopper. The stopper 40 has an outer end handle portion 41 and an inner end 42 with an intermediate flange 43 which rests on the outer end of the spout 37 when the stopper 40 is inserted. The inner end 42 is of such diameter as to fit snugly within the spout 37 and has an outer annular locking ring 44 interrupted by two opposite notch portions 45 which will accept the inner locking tabs 38 of the spout 37, to lock the stopper 40 within the spout 37. A hook-type can opener 46 is rigidly mounted to and extends from the inner end 42 of the stopper 40. When the stopper 40 is in place, the opener 46 projects into and is stored within the funnel 30, the opener 46 being smaller in width than the opening of the spout 37. The opener 46 is of the type utilized to make two opposite triangular shaped holes in the oil can a by which the oil may be added to the vehicle engine.

In use, the present apparatus is mounted by the canister mounting brackets 14 to a convenient support of a motor vehicle, such as a wall of the engine compartment forward of the automobile engine. A can of oil is then inserted through the open upper end 14 and the funnel-like member 30 is secured to the canister body 10 by engagement of the funnel locking tabs 34 with the canister locking ring 18. The stopper 40 is similarly secured within the spout 37.

When it is desired to add oil to the engine, the funnel 30 is removed from the canister 10, the can a is removed from the canister 10 and the stopper 40 is removed from the funnel 30. By manipulating the hook-type opener 46 of the stopper 40 by its outer end handle 41, the triangular holes may be made in the can top. The oil may then be poured into the engine, utilizing the funnel 30.

If all the oil is utilized, the can may be discarded, but if only a portion of the oil in the can is added to the engine, that can may be reinserted into the canister body 10 and the funnel 30 with the stopper 40 again secured to the canister 10, forming a dust and moisture free seal, so that the oil may be utilized later when needed.

Construction of the apparatus may be of any convenient material, such as molded plastic, thin sheet metal or other suitable material. The hook-type can opener 46 should be of metal or other suitably strong material.

An alternative embodiment of the present invention, shown in FIG. 2, may be mounted to the canister body 10 of the preferred embodiment of FIG. 1; it may also be mounted directly to an oil can a, whereby to aid in adding the oil to the engine. The apparatus includes a funnel-like member, generally designated 50, and later referred to as a funnel, preferably molded of plastic and having a relatively large receiving end portion, generally designated 51, tapering to a smaller discharging end portion, generally designated 52. The receiving end portion 51 has a cylindrical end 53 with a pair of locking tabs 54 and an annular sealing ring 55 like the preferred embodiment of FIG. 1, and may therefore be mounted to the canister body 10 of FIG. 1. Inward of its cylindrical end 53, the receiving end portion 51 has a tapered wall 56 extending to the discharging end portion 52. On its inner side, the tapered wall 56 has a longitudinally-projecting annular can container mounting provision 57, including an outer lip 58 and an inner lip 59, which accept and sealingly mount or graspingly engage between them the crimped edge of the circular end of a can container a. The discharging end portion 52 of the funnel 50 is made up of an externally-threaded spout 60.

A stopper member, generally designated 70, may be secured to the externally-threaded spout 60. The stopper 70 is made up of an internally-threaded cap 71, which will screw to the spout 60 and which joins a handle 72 on the outer end of the stopper 70 to a piercing blade type can opener 73 on the stopper inner end. Where the handle 72 mounts to the cap 71, a hand-guard flange 74 is provided, adjacent to the inner end of the stopper. The can opener 73 is utilized to pierce a small, half-round hole in the upper end of the can a.

Use of this alternative apparatus will be obvious to persons familiar with adding oil to auto engines. By removing the funnel 50 from the canister 10, access is gained to the can a. Before or after removing the can a from the canister 10, the stopper is removed from the funnel and utilized to make one or more holes in the can top and the funnel 50 is then mounted to the can by its can-mounting provision 57. Thereafter, the can a with the attached funnel 50 may be inverted to add the oil from the can a to the engine.

The advantages of the present invention are numerous. It provides a convenient means such that a can of oil may be carried with a vehicle at all times for addition to the engine when needed. This is accomplished without fear of leaking oil on carpeting or items stored in the vehicle. By providing a can opener stored within the funnel, which may then be mounted with the oil can, these are available for use in adding the oil to the engine and will not be misplaced or roll about within the vehicle.

Modifications to these embodiments will be apparent to persons skilled in the art. For example, other mounting bracket means may be provided, as well as other means for securing the funnel-like member to the canister, such as screw threads. Likewise, the stopper may be secured to the funnel spout by any means which will insure the stopper will not vibrate out. As an example, a rubber stopper which is pushed in place could be utilized. It will be apparent that other can opener means may be substituted, as long as the width of the opener is less than that of the spout opening. Where several cans of oil may be required, the canister may be axially enlarged to accept them, in stacked position. From these examples, other modifications will suggest themselves.

I claim:

1. Apparatus for storing a cylindrical can container of oil or the like on a motor vehicle, comprising
   a canister having an open upper end and being of such internal width as to accept and support a can container inserted through the open upper end, and being of such height that a portion of such can container so supported will extend above the canister upper end,
   mounting bracket means, formed in a vertical plane, to mount the canister to a motor vehicle, and
   a funnel-like member having a larger receiving end including means for mounting to the open upper end of the canister, a smaller opposite discharging end terminating in a spout, and an intermediate tapered wall portion,
   said intermediate tapered wall portion having, radially inward of the means for mounting to the canister and spaced toward the opposite discharging end of the funnel, means to graspingly engage the end of such can container, together with
   removable stopper means to close the spout.

2. Apparatus for storing a cylindrical can container of oil or the like on a motor vehicle, comprising
   a substantially cylindrical canister having an open upper end and being of such size as to accept and support a can container inserted through the open upper end, the height of the canister being such that a portion of such can container supported in the canister will extend above the canister open upper end, the canister having, on its inner side wall, longitudinal ribs, whereby the can is stored in the canister with its outer wall spaced inward of the canister side wall, to prevent rattling and reduce suction formed in removing the can, mounting bracket means, formed in a vertical plane, to mount the canister to a motor vehicle, in combination with a funnel-like member having a larger receiving end terminating in a substantially cylindrical portion of sufficient depth to fit about that portion of the can container extending above the canister open upper end, the cylindrical portion including means for mounting, when the funnel-like member is inverted, to the open upper end of the canister, the funnel-like member further having a smaller opposite discharging end terminating in a spout, the larger receiving end of the funnel-like member including, radially inward of the means for mounting to the canister and spaced toward the opposite discharging end of the funnel, means to graspingly engage the end of the can container, and further comprising removable stopper means to close the spout.

* * * * *